3,117,166
PEROXY DERIVATIVES OF 2,5-DIMETHYL-
HEXANE-2,5-DIHYDROPEROXIDE
James B. Harrison, Eggertsville, and Orville L. Mageli,
Grand Island, N.Y., assignors to Wallace & Tiernan
Incorporated, Newark, N.J.
No Drawing. Filed June 1, 1959, Ser. No. 817,094
3 Claims. (Cl. 260—610)

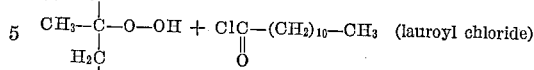

The present invention relates to peroxy derivatives of 2,5-dimethylhexane-2,5-dihydroperoxide.

The parent 2,5-dimethylhexane-2,5-dihydroperoxide offers interesting possibilities as a polymerization initiator, but is not particularly suitable for so-called high temperature operation because of its sensitivity to induced decomposition.

The polyfunctional 2,5-dimethylhexane-2,5-dihydroperoxide offers, however, a medium from which other polyfunctional peroxides can be prepared, such polyfunctional peroxy compounds being suitable for use particularly as polymerization initiators or the so-called polymerization catalysts.

It has been found that the products of the present invention do not suffer from the defect of the parent.

The novel peroxy compounds of the present invention are derivatives of 2,5-dimethylhexane-2,5-dihydroperoxide and include (a) alkyl esters thereof, (b) alkyl derivatives thereof, (c) the so-called percarbonates thereof, and (d) the reaction products of that polyfunctional dihydroperoxide with the lower aryl and alkyl aldehyde such as benzaldehyde or formaldehyde.

The new compounds of the present invention include the reaction products with what may be called difunctional acid chlorides, including phosgene, phthalyl chloride, succinyl chloride and maleyl or fumaryl chloride, the latter difunctional acid chlorides being capable of producing polymeric derivatives.

The novel compositions of the present invention thus include esters prepared by the reaction of substantially stoichiometric quantities of specified acyl chlorides, the end products being generally designated as peresters. The alkyl group of the resulting ester may contain from 1 to 11 carbon atoms. Such peresters may be prepared by techniques generally employed for the reaction of a hydroperoxide group with an acid chloride or an acid anhydride in the alkyl series.

When the polyfunctional hydroperoxide 2,5-dimethylhexane-2,5-dihydroperoxide is reacted with a haloformate or related material, a percarbonate is the resultant product, the percarbonates differing from esters, R'COR, where R' is the peroxy radical of 2,5-dimethylhexane-2,5-dihydroperoxide, and R is the radical from the employed acid chloride or anhydride, while the percarbonates are R''COOR, wherein R may be a saturated aliphatic group of from 1 to 11 carbon atoms inclusive, and may include halogen-substituted alkyl radicals as for instance $ClCH_2-$.

As specific examples of the possible compositions of the present invention, one may react substantially a molar quantity of 2,5-methylhexane-2,5-dihydroperoxide with 2 molar quantities of the acid chloride of lauric acid, shown schematically below by Formula 1 as follows:

(1)
$$\begin{array}{l} H_3C \\ CH_3-\overset{|}{C}-O-OH + Cl\overset{O}{\underset{\|}{C}}-(CH_2)_{10}-CH_3 \text{ (lauroyl chloride)} \\ \overset{|}{H_2C} \\ \overset{|}{H_2C} \\ CH_3-\overset{|}{C}-O-OH + Cl\overset{O}{\underset{\|}{C}}-(CH_2)_{10}-CH_3 \\ \overset{|}{H_3C} \end{array} \longrightarrow$$

$$\begin{array}{l} H_3C \\ CH_3\overset{|}{C}-O-O-\overset{O}{\underset{\|}{C}}-C_{11}H_{23} \\ \overset{|}{H_2C} \\ \overset{|}{H_2C} \\ CH_3\overset{|}{C}-O-O-\overset{O}{\underset{\|}{C}}-C_{11}H_{23} \\ \overset{|}{H_3C} \end{array}$$

2,5-dimethylhexane-2,5-di(peroxylaurate)

The reaction to produce the percarbonate, as for instance by reaction of one molar quantity of 2,5-dimethylhexane-2,5-dihydroperoxide with two molar quantities of ethylchloroformate will produce the percarbonate as shown in the specific example in Formula 2 as follows:

(2)
$$\begin{array}{l} H_3C \\ CH_3\overset{|}{C}-O-OH + Cl\overset{O}{\underset{\|}{C}}-OC_2H_5 \\ \overset{|}{H_2C} \\ \overset{|}{H_2C} \\ CH_3\overset{|}{C}-O-OH + Cl\overset{O}{\underset{\|}{C}}-OC_2H_5 \\ \overset{|}{H_3C} \end{array} \longrightarrow \begin{array}{l} H_3C \\ CH_3\overset{|}{C}-OO-\overset{O}{\underset{\|}{C}}-OC_2H_5 \\ \overset{|}{H_2C} \\ \overset{|}{H_2C} \\ CH_3\overset{|}{C}-OO-\overset{O}{\underset{\|}{C}}-OC_2H_5 \\ \overset{|}{H_3C} \end{array}$$

2,5-dimethylhexane-2,5-di(peroxyethylcarbonate)

The reaction with one molar quantity of benzaldehyde appears probably to involve an addition mechanism with the production of an unstable compound from which water is eliminated with production of what is believed to be a final heterocyclic peroxy ring compound, the ultimate and complete reaction probably being suitably illustrated as follows:

(3)
$$\begin{array}{l} H_3C \\ H_3\overset{|}{C}-O-OH \\ \overset{|}{H_2C} \\ \overset{|}{H_2C} \\ CH_3\overset{|}{C}-O-OH \\ \overset{|}{H_3C} \end{array} + O=\overset{H}{\underset{}{C}}-C_6H_5 \longrightarrow \begin{array}{l} H_3C \\ CH_3\overset{|}{C}-O-O \\ \overset{|}{H_2C_3} \\ \overset{|}{H_2C_2} \\ CH_3\overset{|}{C}-O-O \\ \overset{|}{H_3C} \end{array} H\overset{|}{C}-C_6H_5$$

1,1,4,4-tetramethyl-7-benzyl-cyclo-4,7-diperoxynonane

The alkyl derivatives may be thought of as the reaction product of a molar quantity of the dihydroperoxide with 2 molar quantities of an aliphatic alcohol effected through the mechanism, for instance, of an alkyl ester of an inorganic acid, such as sulfuric acid.

(4)
$$\begin{array}{l} CH_3 \\ CH_3-\overset{|}{C}-OOH \\ \overset{|}{H_2C} \\ \overset{|}{H_2C} \\ CH_3-\overset{|}{C}-OOH \\ \overset{|}{CH_3} \end{array} + \overset{CH_3}{\underset{CH_3}{\overset{|}{\underset{|}{S}}O_2}} \longrightarrow \begin{array}{l} CH_3 \\ CH_3-\overset{|}{C}-O-O-CH_3 \\ \overset{|}{H_2C} \\ \overset{|}{H_2C} \\ CH_3-\overset{|}{C}-O-O-CH_3 \\ \overset{|}{CH_3} \end{array} + HO.SO_2.OH$$

2,5-dimethyl-2,5-di(methylperoxy)hexane

Where stoichiometric quantities of reactants are chosen, as indicated above, based upon the presence of two hydroperoxide groups in the parent compound, the diperoxy derivatives are the end result. If it be desired to produce the monoderivative, as for instance the monoperoxy ester, one-half of the stoichiometric amount of reactant required to react with all of the hydroperoxide groups is chosen as the reactant, and it is suggested that the reaction preferably, under such circumstances, be carried out in an inert organic solvent. Having prepared initially a monoderivative containing a free hydroperoxide group, a mixed derivative can thereafter be prepared from such monoderivative.

The new products of the present invention are either solids or high boiling point oils which possess particular efficacy as initiators of polymerization reaction, depending upon polymerization by reason of the presence of ethylenic unsaturation, as for instance in vinyl compounds and in the polyester materials, each of which possesses vinyl or ethylenic unsaturation. In the case of the vinyl compounds, exceptionally clear, colorless, and nondarkening products result.

The following examples are given as specific illustrations of representative compounds prepared within the scope of the invention and are not to be deemed as limitative of the invention. In substantially all instances, the active oxygen content was determined by accepted standard procedures, as for instance, by potassium iodide thiosulfate titration; by ultimate analysis for carbon and hydrogen; or by molecular refraction and, in some instances, some or all of these testing techniques were employed.

In Example 1 immediately below, there is described a suggested procedure for preparing the parent dihydroperoxide in excellent yield and of exceptional purity after one recrystallization.

EXAMPLE 1

2,5-Dimethylhexane-2,5-Dihydroperoxide

To 462 gm. (6.8 moles) of 50% hydrogen peroxide was gradually added, over a period of 30 minutes, 434 gm. of 77% sulfuric acid with vigorous stirring. The temperature was kept at 10° C. Then a 100 gm. (0.69 mole) of 2,5-dimethylhexanediol-2,5 was added to the acid-hydrogen peroxide mixture in a single dose. Stirring was continued at 10° C. for 10 minutes then gradually warmed up to room temperature and continued for an additional hour.

The crude dihydroperoxide was washed first with 100 ml. of unsaturated ammonium sulfate solution and then with two washings of 100 ml. portions of appropriate salt. The last washing had a pH of 5 and showed no reaction with catalase. After drying overnight in a Stokes dryer, the product weighed 103 gms. (82% yield, 16% active oxygen). Recrystallization from benzene yielded 90 gms. with 17.6% active oxygen (98% purity).

EXAMPLE 2

2,5-Dimethylhexane-2,5-Di(Peroxyacetate)

To 8.9 g. (0.05 mole) of 2,5-dimethylhexane-2,5-dihydroperoxide dissolved in 100 ml. of pyridine-ethyl ether mixture was added, dropwise, with rapid stirring, 7.9 g. (0.1 mole) of acetyl chloride. The temperature was maintained at 0–5° C. during the 30 minute addition period. The pyridine hydrochloride was removed by solution in water, the ether phase separated, thoroughly washed (water, 10% sodium bicarbonate, saturated tartaric acid) then dried over anhydrous magnesium sulfate. Removal of the ether under reduced pressure gave a clear, highly shock-sensitive oil $n_D^{25}$ 1.4417.

Calculated for $C_{12}H_{22}O_6$: Act. oxygen, 12.2%. Found: Act. oxygen 12.3%.

This material decomposed rapidly at 110–115° C. when heated at the rate of 4° C. per minute.

EXAMPLE 3

2,5-Dimethylhexane-2,5-Di(Acid Peroxyphthalate)

A solution of 9 g. (0.05 mole) of the dihydroperoxide in 0.2 mole of pyridine and 50 ml. of ether was gradually added to 0.1 mole of phthalic anhydride dissolved in 50 ml. of pyridine. During the addition, the reacting mixture was kept at 0–5° C. The temperature was then allowed to rise to room temperature during the subsequent two-hour stirring period. The ether phase was washed several times with saturated tartaric acid solution. When water was added to the ether, a voluminous, white precipitate formed. Further solid material was recovered from the ether phase. Purification by recrystallization and salt preparations gave a solid product, melting point 114° C.

Calculated for $C_{24}H_{26}O_{10}$: Act. oxygen, 6.75%; neut. equiv., 237. Found: Act. oxygen, 6.4%; neut. equiv., 228.

EXAMPLE 4

2,5-Dimethylhexane-2,5-Di(Acid Peroxysuccinate)

To a solution of 0.1 mole of succinic anhydride in 50 ml. of ether containing pyridine was added 9 g. (0.05 mole) of dihydroperoxide. The mixture was stirred for three hours at room temperature. At the end of this reaction period, the pyridine was removed with saturated tartaric acid solution. The solid product was isolated from the ether, thoroughly washed, dried and recrystallized from aqueous methanol, melting point 126–128° C.

Calculated for $C_{16}H_{26}O_{10}$: Act. oxygen, 8.46%; neut. equiv., 189. Found: Act. oxygen, 6.84%; neut. equiv., 191.

EXAMPLE 5

Polymeric Peroxyesters From 2,5-Dimethylhexane-2,5-Dihydroperoxide

A. *Reaction with o-phthalyl chloride.*—To a solution of the dihydroperoxide in ether containing pyridine was added, dropwise, at room temperature, with rapid stirring, an equal molar amount of phthalyl chloride. After a one hour reaction period, an ether soluble water insoluble polymer peroxidic polymer was obtained. Melting point 106–108° C. (decomposition).

Calculated for: $C_{16}H_{20}O_6$: Act. oxygen, 10.4%. Found: Act. oxygen, 7.41%.

B. *Reaction with phosgene.*—To a solution of 9 g. (0.5 mole) of the dihydroperoxide dissolved in 80 ml. of 5% sodium hydroxide was slowly added a toluene solution of phosgene containing 0.05 moles of phosgene. The reaction mixture was held at 0±3° C. throughout the addition and for one hour longer. Then the whole mixture was allowed to warm to room temperature. The solid material recovered from the toluene and as an insoluble portion was washed and dried. Melting point 101–103° C.

Calculated for $C_9H_{16}O_5$: Act. oxygen, 15.7%. Found: Act. oxygen, 16.69%.

C. *Reaction with fumaryl chloride.*—Into an ice-cold solution containing 17.8 g. (0.1 mole) of the dihydroperoxide in diluted potassium hydroxide was slowly added 15.3 g. (0.1 mole) of fumaryl chloride. After the 25 minute addition period, a white, gummy solid was separated from the solution. Reprecipitation of the polymer from water-methanol gave 15 g. (58% yield) of a white solid. Melting point 56–62° C.

Calculated for $C_{12}H_{18}O_6$: Active oxygen, 12.4%. Found: Active oxygen, 9.5%.

EXAMPLE 6

2,5-Dimethyl-2,5-Di(t-Butylperoxy) Hexane

To 320 g. of 70% sulfuric acid was slowly added 180 g. (2.4 moles) of t-butanol. The reaction temperature was held at 5–10° C. during the 45 minute addition period. To this mixture was added in a single portion, 100 g. (0.56 mole) of the dihydroperoxide. The temperature was allowed to rise to 40° C. and stirring was continued for 5 hours. The product was extracted with ethyl ether, then washed as a solution with dilute sodium bicarbonate and then water. Separation of the ethereal solution, drying over anhydrous magnesium sulfate, filtration and removal of the ether under reduced pressure left a pale yellow oil. Distillation yielded a colorless liquid, boiling point 50-52° C. (0.1 mm.).

$n_D^{28}$ 1.4185
$d_4^{28}$ 0.8728

Calculated for $C_{16}H_{34}O_4$: C, 66.30%; H, 11.73%; $MR_D$, 83.8. Found: C, 66.16%; H, 11.65%; $MR_D$, 84.0.

EXAMPLE 7

*2,5-Dimethylhexane-2,5-Di(Peroxy Ethyl Carbonate)*

To a cold (0° C.) solution containing 9 g. (0.05 mole) of the dihydroperoxide, 80 ml. of ethyl ether and 12 ml. (0.15 mole) of pyridine was slowly added 11 g. (0.1 mole) ethyl chlorocarbonate. The addition period of 15 minutes was followed by an additional 15 minute stirring period. The reaction mixture was then filtered to remove solid pyridine hydrochloride. The ethereal solution was thoroughly washed, then dried over anhydrous magnesium sulfate. Removal of the ether under reduced pressure left a colorless, sweet-smelling oil.

$n_D^{27}$ 1.4423
$d_4^{27}$ 1.067

Calculated for $C_{14}H_{26}O_8$: C, 52.16%; H, 8.13%; $MR_D$, 76.70; active oxygen, 9.93%. Found: C, 53.08%; H, 8.70%; $MR_D$, 79.60; active oxygen 9.80%.

EXAMPLE 8

*2,5-Dimethylhexane-2,5-Di(Peroxy Beta-Chloroethyl Carbonate)*

To a cold (0° C.) solution containing 9 g. (0.05 mole) of the dihydroperoxide, 80 ml. of ethyl ether and 12 ml. (0.15 mole) of pyridine was slowly added 14.3 g. (0.1 mole) beta-chloroethyl chlorocarbonate. The addition period of 15 minutes was followed by an additional 15 minute stirring period. The reaction mixture was then filtered to remove solid pyridine hydrochloride. The ethereal solution was thoroughly washed, then dried over anhydrous magnesium sulfate. Removal of the ether under reduced pressure left a colorless liquid.

$n_D^{26}$ 1.4535
$d_4^{27}$ 1.164

Calculated for $C_{14}H_{24}O_8Cl_2$: $MR_D$, 87.76; active oxygen, 8.19%. Found: $MR_D$, 90.70; active oxygen, 7.90%.

EXAMPLE 9

*2,5-Dimethylhexane-2,5-Di(Peroxy Isobutyl Carbonate)*

To a cold (0° C.) solution containing 9 g. (0.05 mole) of the dihydroperoxide, 80 ml. of ethyl ether and 12 ml. (0.15 mole) of pyridine was slowly added 13.7 g. (0.1 mole) isobutyl chlorocarbonate. The addition period of 15 minutes was followed by an additional 15 minute stirring period. The reaction mixture was then filtered to remove solid pyridine hydrochloride. The ethereal solution was thoroughly washed, then dried over anhydrous magnesium sulfate. Removal of the ether under reduced pressure left a slightly yellowish liquid.

$n_D^{25}$ 1.4357

Calculated for $C_{18}H_{34}O_8$: Active oxygen, 8.46%. Found: Active oxygen, 6.44%.

EXAMPLE 10

*2,5-Dimethylhexane-2,5-Di(Hydroxymethyl Peroxide)*

To an aqueous slurry of 9 g. (0.05 mole) of the dihydroperoxide in 10 ml. of water at room temperature was added 4 g. (0.13 mole) of formaldehyde. After a two-hour reaction period, the product was extracted with ether and water washed to remove excess formaldehyde. Drying of the ethereal solution followed by removal of the ether under reduced pressure gave a colorless liquid.

$n_D^{23}$ 1.4518
$d_4^{24}$ 1.085

Calculated for $C_{10}H_{22}O_6$: C, 50.40%; H, 9.31%; $MR_D$, 59.34; active oxygen, 13.45%. Found: C, 50.13%; H, 9.12%; $MR_D$, 57.0; active oxygen 13.23%.

EXAMPLE 11

Benzaldehyde adducts:

(a) 2,5-dimethylhexane-2,5-di(hydroxybenzyl peroxide)
(b) 1,1,4,4-tetramethyl-7-benzyl-cyclo-4,7-diperoxonane.

To a cold (0.5° C.) solution of 9 g. (0.05 mole) of the dihydroperoxide in 50 ml. of anhydrous ether was added, with rapid stirring, 8.7 g. of 70% sulfuric acid. Immediately following the acid addition 12.7 g. (0.12 mole) of benzaldehyde was added. The mixture was allowed to warm gradually to room temperature and was stirred for a period of one hour. The ether phase was separated, combined with further ether extracts and thoroughly washed (dilute sodium bicarbonate solution, water) and dried over anhydrous magnesium sulfate. Removal of the ether under reduced pressure left 20 g. of a yellow oil.

Calculated for (compound 11a) $C_{22}H_{30}O_6$: Active oxygen, 8.20%. Found: Active oxygen, 7.3%.

When the yellow liquid was stored at 0° C., white crystals slowly separated, melting point 50° C.

Calculated for (compound 11b) $C_{15}H_{22}O_4$: Active oxygen, 12.0%. Found: Active oxygen, 11.3%.

EXAMPLE 12

*2,5-Dimethyl-2-t-Butylperoxy-5-Hydroperoxyhexane*

A mixture containing 74.3 g. of 96% dihydroperoxide (0.4 mole), 34 g. of 88% aqueous t-butanol (0.4 mole), 51 g. of 77% sulfuric acid (0.4 mole) and 200 ml. of benzene was allowed to react for two hours at 25° C. The organic phase was then separated, thoroughly washed (dilute sodium bicarbonate, water), dried over anhydrous magnesium sulfate, filtered and the solvent removed under reduced pressure to yield 78 g. (84% yield) of an oil assaying 89% pure. The crude material was purified by isolation through the sodium salt, the regenerated product fractionally distilled under reduced pressure. The fraction boiling point 54–56° (0.005 mm.) was analyzed.

$n_D^{26}$ 1.4325
$d_4^{26}$ 0.9293

Calculated for $C_{12}H_{26}O_4$: C, 61.54%; H, 11.11%; $MR_D$, 65.18. Found: C, 61.66%; H, 11.15%; $MR_D$, 65.21.

EXAMPLE 13

*2,5-Dimethyl-2-t-Butylperoxyhexane-5-Peroxyacetate*

To a solution containing 23.4 g. (0.1 mole) of compound of Example 12 (2,5-dimethyl-2-t-butylperoxy-5-hydroperoxyhexane) in 150 ml. of diethyl ether and 15.6 g. (0.2 mole) of pyridine was slowly added 15.8 g. (0.2 mole) of acetyl chloride. The temperature was maintained at 5–10° C. during the addition, then was allowed to rise to 25° C. during the subsequent one hour stirring period. The solid pyridine hydrochloride was removed by filtration and the ether solution thoroughly washed (saturated tartaric acid, water, dilute sodium bicarbonate), dried and filtered. Removal of the solvent left 20 g. (74%) yield of a crude product. Distillation yielded a fraction boiling point 52–54° C. (0.005 mm.).

$n_D^{25}$ 1.4315
$d_4^{25}$ 0.944

Calculated for $C_{14}H_{28}O_5$: Active oxygen, 5.80%; $MR_D$, 74.55. Found: Active oxygen, 5.32%; $MR_D$, 75.72.

As will be seen from the study of the above experimental results, 2,5-dimethylhexane-2,5-dihydroperoxide is difunctional in that it possesses in the molecule two acidic hydrogens, one in each of the hydroperoxide groups that can be readily replaced by various organic functional groups. Upon such replacement there results, a series of compounds which are themselves polyfunctional, as for instance the alkyl peroxy esters, the peroxy carbonates and other adducts, substantially all of which are nonshock-sensitive and which, as active catalysts, will initiate polymerization in various polymer systems containing the ethylenic or vinyl group at fairly high temperatures.

What is claimed is:

1. A diperoxy compound selected from the group consisting of 2,5-dimethyl-2,5-di(t-butylperoxy)hexane and 2,5-dimethyl-2-t-butylperoxy-5-hydroperoxyhexane.

2. 2,5-dimethyl-2,5-di(t-butylperoxy) hexane.
3. 2,5-dimethyl-2-t-butylperoxy-5-hydroperoxyhexane.

References Cited in the file of this patent

UNITED STATES PATENTS

| | | |
|---|---|---|
| 2,374,789 | Strain | May 1, 1945 |
| 2,455,569 | Dickey | Dec. 7, 1948 |
| 2,605,291 | Barusch et al. | July 29, 1952 |
| 2,670,384 | Milas | Feb. 23, 1954 |
| 2,813,127 | White | Nov. 12, 1957 |
| 2,916,481 | Gilmont | Dec. 8, 1959 |

OTHER REFERENCES

Kharasch et al., Jour. Organic Chem., vol. 18, March 1953, page 326.

Tobolsky et al., "Organic Peroxides," page 159 (1954).

UNITED STATES PATENT OFFICE
CERTIFICATE OF CORRECTION

Patent No. 3,117,166                      January 7, 1964

James B. Harrison et al.

It is hereby certified that error appears in the above numbered patent requiring correction and that the said Letters Patent should read as corrected below.

Column 2, lines 42 to 50, equation (3) should appear as shown below instead of as in the patent:

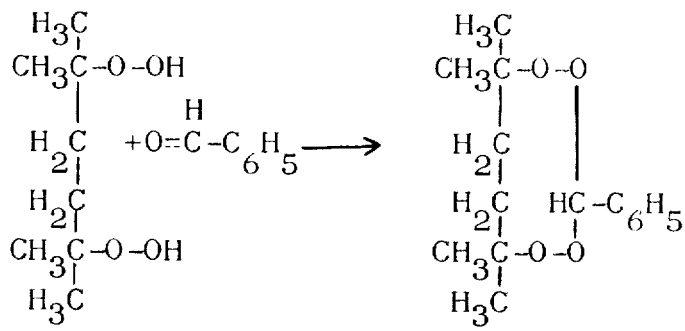

column 6, line 16, for "(b) 1,1,4,4-tetramethyl-7-benzyl-cyclo-4,7-diperoxonane." read -- 1,1,4,4-tetramethyl-7-benzyl-cyclo-4,7-diperoxynonane. --.

Signed and sealed this 21st day of July 1964.

(SEAL)
Attest:

ESTON G. JOHNSON                      EDWARD J. BRENNER
Attesting Officer                   Commissioner of Patents